April 14, 1925.
J. H. DERBY
ELECTRIC LIQUID HEATING APPARATUS
Filed Jan. 11, 1922    2 Sheets-Sheet 2
1,533,541
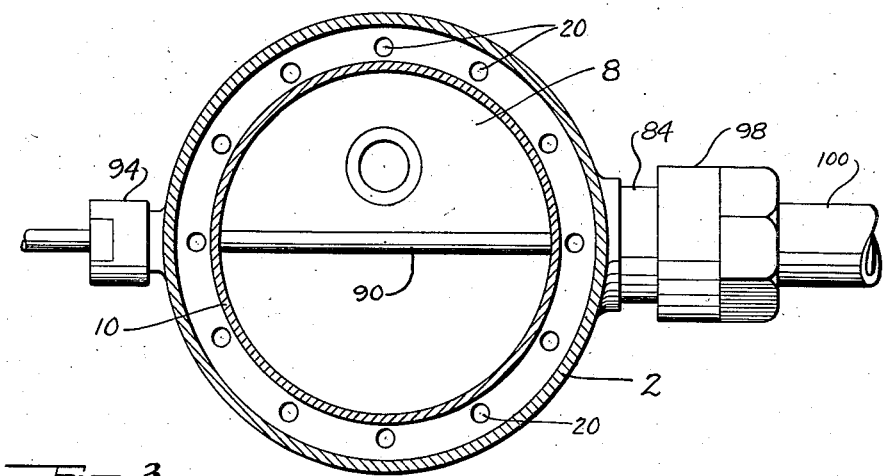
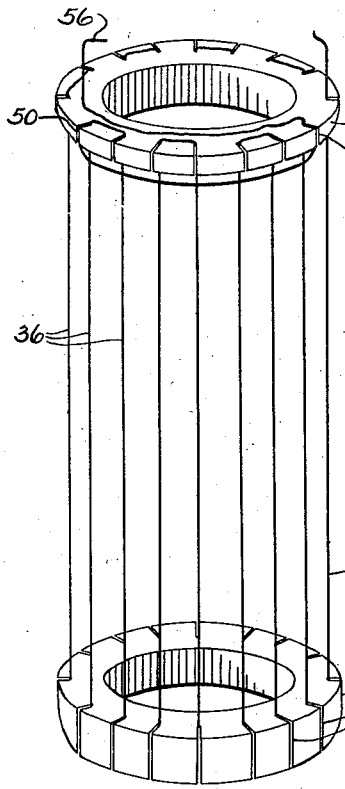
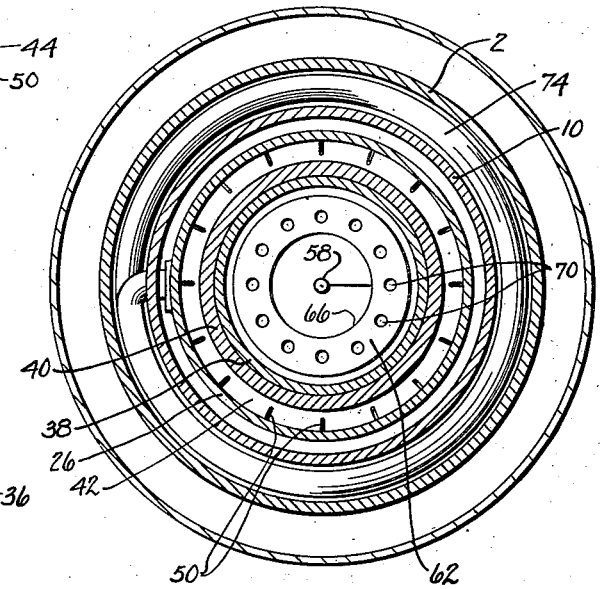
INVENTOR
John H. Derby
BY
Newell and Shenner
ATTORNEYS Patented Apr. 14, 1925.

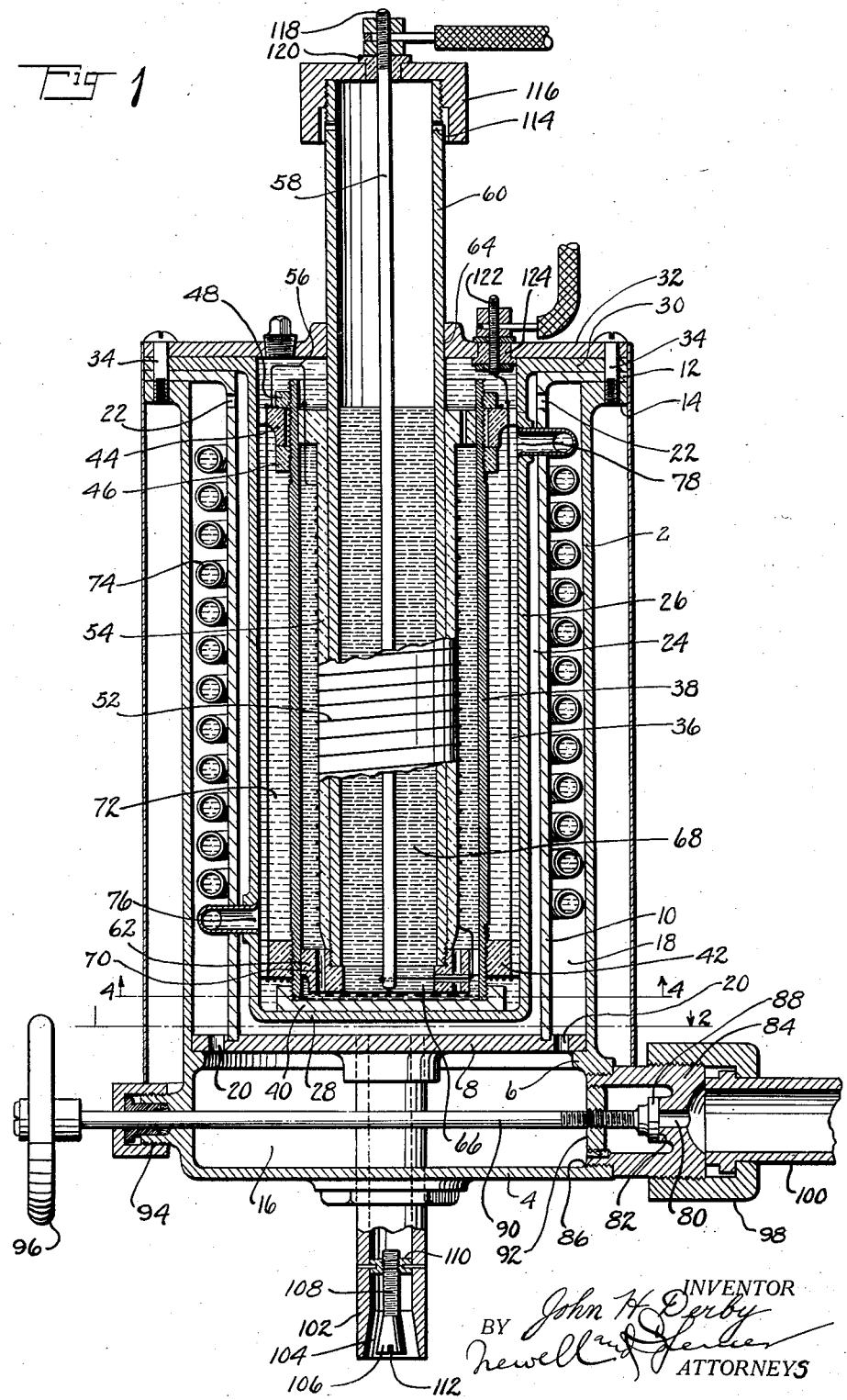

1,533,541

UNITED STATES PATENT OFFICE.

JOHN H. DERBY, OF NEW YORK, N. Y.

ELECTRIC LIQUID-HEATING APPARATUS.

Application filed January 11, 1922. Serial No. 528,423.

*To all whom it may concern:*

Be it known that I, JOHN H. DERBY, a citizen of the United States, residing at New York city, New York, have invented certain new and useful Improvements in Electric Liquid-Heating Apparatus, of which the following is a clear, full, and exact description.

This invention relates to electrical heating means and particularly to means for heating water or other liquids or fluids electrically. The invention also relates to means for automatically controlling the flow of current through an electric circuit in order to obtain certain predetermined uniform results from the work performed by said current.

A particular object of the present invention is to provide a compact but highly efficient heating device which may be attached, for example, to water piping in place of the usual faucet and which may be plugged into the usual electric outlet without special provision in the way of wiring or fuses and which, when thus connected, will supply, upon demand, water heated to the desired temperature and in sufficient quantities for ordinary use.

The invention aims further to provide electrical water heating apparatus which will be self-governing so that the current supplied to the apparatus to be converted into heat units will vary in proportion to the demand made upon said apparatus, whereby it is adapted to heat the water flowing therethrough to the desired predetermined temperature.

The invention also aims to provide automatic governing means for electric circuits having a wide range of utility in the art and which will be free from the usual drawbacks of automatic governing means, such, for example, as the tendency to arc.

Other objects and important features will appear from the following description and claims when considered in connection with the accompanying drawings in which—

Figure 1 is a vertical, substantially central section through an electrical water heating device embodying the present invention;

Fig. 2 is a section on the line 2—2 of Fig. 1;

Fig. 3 is a perspective detail showing the resistance element used in heating; and Fig. 4 is a section on the line 4—4 of Fig. 1.

The illustrated device comprises a series of concentric shells or casings connected together, the outer casing 2 having an integral bottom 4 and having above said bottom an inwardly projecting rib or ledge 6 supporting a disk 8, upon which rests a cylindrical shell 10, having at its upper end an out-turned flange 12 resting upon and attached to the out-turned flange 14 of the casing 2, the shell 10 being concentric with the casing 2. The chamber 16 within the lower end of the casing 2, between the bottom 4 and the disk 8, communicates with the chamber 18 between the casing 2 and the concentric shell 10 through openings 20 in the disk 8. At its upper end the cylindrical shell 10 is provided with openings 22 through which the chamber 18 communicates with a second somewhat narrower annular chamber 24 between the shell 10 and an inner casing 26 having an integral bottom 28 and having at its upper end an out-turned flange 30 resting upon the flange 12 of the shell 10, said out-turned flange 30 together with a cover 32 being connected by screws 34 to the flange 14 of the casing 2, these screws 34 connecting the casing 2, shell 10 and casing 26 together and maintaining said parts in concentric relation to each other.

Within the casing 26 is located the electric heating element which, in the present construction, is shown as comprising a resistance wire 36 supported to form a squirrel-cage-like structure carried upon a tubular support 38, also concentric with the casing 2, shell 10 and casing 26. The tubular support 38 for the resistance element 36 may be formed of metallic tubing threaded at its ends, as shown in Fig. 1, and preferably having upon its lower end a cap 40 closing said end and constituting a liquid-tight bottom for the chamber within the tube 38. The resistance element 36 is supported on and insulated from the tubular support 38 by insulating rings 42 and 44, the ring 42 being threaded directly upon the tube 38 and the ring 44 being supported between a lower supporting nut 46 and an upper clamping nut 48, which permit the proper tensioning of the resistance wire 36 after it is strung upon the rings 42 and 44 in the manner shown in Fig. 3. From an inspection of Fig. 3 of the drawings, it will be seen that each of the rings 42 and 44 is provided with radial slots 50 in the bottoms of which are seated the vertical sections of the wire 38 extending between upper and lower rings 44 and 42, as shown in Fig. 3 of the drawings. The rings 42 and 44 are preferably of such dimensions that they concentrically space the tube 38 from the inner wall of the casing 26.

Within the tube 38 is preferably located a resistance element for controlling the amount of heating current flowing through the heating resistance 36, the illustrated resistance element comprising a resistance wire 52 coiled spirally about a cylindrical support 54 of insulating and preferably refractory material, the wire 52 being spirally wound about the support 54 and being connected at its upper end by a section of wire 56 of comparatively large capacity with one end of the resistance element 36. The other end of the resistance element 52 is connected to a tubular conductor 58 extending centrally up through an inner tube 60 upon which the insulating support 54 is carried.

The tube 60 at its lower end is threaded into a support 62 which holds the tube 60 concentric with the tube 38 at its bottom end, the tube 60 passing through and fitting tightly within a central opening 64 in the cover 32 by which the upper end of the tube is also maintained concentric with the tube 38. The support 62 for the tube 60 has an opening 66 therethrough concentric with the tube 60 and is also spaced from the bottom 40 of the tube 38 whereby mercury 68 contained within the tube 60 and also within the tube 38 may circulate through the openings 70 and 66 in the support 62 between the tubes 60 and 38.

The chamber between the casing 26 and the tube 38 in which the heating element 36 is located is preferably filled with oil 72 of a high flash point, such, for example, as transformer oil, which serves as a heat storage medium and a heat conducting medium for absorbing the heat from the heating element 36 and storing it or transferring it to the water to be heated. To facilitate the circulation of the oil which is required for uniform heating thereof and to expose as large a surface of oil as possible to the heat transferring walls through which the heat is transferred to the water to be heated, there is preferably provided a circulating coil or spiral tube 74 communicating at both ends with the oil chamber, as shown at 76 and 78, one end 76 communicating with the oil chamber near the lower end thereof and the other end 78 communicating with the oil chamber near the upper end thereof, the coil itself being preferably located in the outer water chamber 18.

The water to be heated preferably enters the chamber 16 in the outer casing 2 first and to control its flow the apparatus preferably comprises a valve carried by the casing 2. In the illustrated construction, the valve opening 80 and the valve seat 82 are carried by a nipple 84, which is screwed into an opening 86 tapped into the casing 2. The valve 88 is carried upon a stem 90 threaded through a cross piece 92 screwed into the nipple 84, the stem 90 preferably extending across the casing 2 and through the other wall thereof, where it is preferably surrounded by a stuffing box 94. At its outer end the stem 90 carries a handle 96 by which the valve may be operated. The nipple 84 may be connected to the water main in any suitable manner, as, for example, by the union 98 upon a shouldered nipple 100.

The water discharge outlet of the heater comprises a nozzle 102 having a conical orifice 104, the nozzle 102 extending through the chamber 16 in the casing 2 and opening into the chamber 24 between the shell 10 and the casing 26, being screwed into the removable disk 8, which constitutes the bottom of this chamber.

In order to control the flow of the water through the heater and particularly the rate of discharge, there is preferably located in the orifice 104 a conical plug 106 which has a stem 108 threaded through a crossbar 110 secured in the nozzle 102 in any suitable manner, as, for example, by being forced into the nozzle. By adjusting the plug 106 up and down in the conical orifice 104, the plug 106 being preferably provided with a kerf 112 to receive a screwdriver, the space between the plug 106 and the wall of the orifice 104 may be varied, thus varying the thickness of the stream flowing out of the nozzle without varying its apparent diameter. In this manner the rate of discharge may be controlled and thus the heating effect for a given time may be varied. Such an adjustment is important to take care of the variations in the temperature of the pipe water at different seasons of the year. It is also important in providing for the different degrees of heat which may be required for the different purposes for which the heater is used.

As hereinabove suggested, the tube 60 preferably extends to a distance above the cover 32 of the device to provide for the reception of the mercury displaced from the chamber between the tube 38 and the tube 60 when the oil pressure increases, as hereinafter described. The tube 60 is also provided with vents 114 and with a cap 116 shaped to form a dust shield over the vents 114, one of the electric terminals 118 of the device being preferably carried by the cap 116 and insulated therefrom by suitable insulation 120. The other terminal 122 is carried by the cover 32 and is insulated from said cover by suitable insulation 124.

From the foregoing description the operation of the device will readily be understood. When the contents of the device have not been heated and the current is turned on with the oil and mercury in the position shown in Fig. 1 of the drawings, it will be seen that the mercury is at such a level that it completely short circuits the resistance 52, the resistance 52 being in series with the resistance 36 and being short circuited out of the heating circuit when current to the full capacity of the heating circuit may flow through said circuit, thus effecting a rapid heating of the oil in the chamber 72. It will be obvious that the oil as it is heated will circulate through the coil 74 until all of the oil both in the coil 74 and in the compartment 72 is heated to substantially the same temperature. As the oil is heated it will expand somewhat and will also cause an expansion of any air or vapor above it, thus creating a pressure on the upper surface of the mercury 68 in the compartment between the tube 38 and the tube 60 whereby the mercury will be forced down in this annular compartment between the two tubes and will rise in the tube 60. As the mercury travels down in the annular compartment between the tube 38 and the tube 60 it gradually uncovers the resistance 52, which it has before short circuited, thus bringing this resistance into the circuit through the heating element 36, thereby cutting down the flow of current through the heating element 36. The resistance 52 is preferably so proportioned to the voltage of the ordinary lamp circuit that when the oil in the compartment 72 is heated to the desired temperature the mercury will have uncovered enough of the resistance 52 to cut the current down to a point where it will simply maintain the oil at the desired temperature.

Such water as may have been in the chamber 18 and the chamber 24 at the time the current is turned on the apparatus will, of course, be heated. The apparatus is intended, however, to heat more than its stored supply of water, which is relatively small, the stored supply of heat in the oil being relatively large whereby when water is admitted by the opening of the valve 82 and flows up over the coil 74 and down through the narrow space 24 between the casing 26 and the shell 10, it will be rapidly heated by the stored heat in the oil which is in the coil 74 and in the casing 26. Moreover, this water passing over that section of the outlet which is in the chamber 16 absorbs some heat from the water passing to the outlet, thus tending somewhat to equalize the temperature of the water by cooling the overheated water which remains in the chamber 18 as it flows into the outlet. If desired, the section of the outlet pipe which passes through the chamber 16 may be bent so that the hot water passing to the outlet has a longer path of travel through the cold water coming into the heater.

It will be seen that as soon as the heat units stored up in the oil are absorbed by the water, the temperature of the oil will be reduced and thus the pressure on the mercury column between the tube 38 and the tube 60 will be reduced, thus permitting the mercury to rise up over the resistance 52 and short circuit more or less of this resistance, according to the amount of heat absorbed, thereby increasing the flow of current through the heating element 36 and rapidly supplying heat to the oil to replace that transferred to the water.

It will readily be understood that by properly proportioning the resistance 52 and the resistance 36, the device may be adapted to operate upon an ordinary lighting circuit. For example, it may be adjusted to take a maximum current of 550 watts when the resistance 52 is short circuited, this being on the usual lighting circuit a flow of 5 amperes at a pressure of 110 volts, and the resistance 52 may be such that when it is all effectively in the circuit the flow of current will be cut down to 1 ampere. It will be understood, of course, that the limits may be varied to meet varying conditions.

It will be observed that the oil which rests upon the surface of the mercury in the annular chamber between the tube 38 and the tube 60 will keep this surface clean and that this oil will cover the spirals of the resistance 52 when the mercury is depressed. A layer of oil, if desired, may also be put upon the surface of the mercury in the tube 60.

It will be seen from the foregoing description that this heating device is substantially self-regulating. It will also be seen that the self-regulating feature of the device is of utility in other fields, being especially useful in any place where it is desired to provide for automatic regulation of current flow by means which will not arc and also by means in which the variation in the current may be made as gradual as desirable. It will also be seen that the device is protected from rapid deterioration of any of the parts by reason of the protection of these parts by the oil, which also acts as a heat storage medium in which heat may be stored up in such manner that it may be quickly transferred to water when desired. To conserve the heat in the apparatus, it is preferably covered with a heat insulating covering such as shown at 115.

What I claim as new is:

1. In apparatus of the class described, circuit terminals, metallic conductors connecting said terminals comprising an electric heating element, a liquid heat storage medium in which said heating element is immersed, a container for said liquid and means governed by variations in the heat in said liquid storage medium for automatically effecting compensating variations in the current flow through said heating element.

2. In apparatus of the class described, circuit terminals, metallic conductors connecting said terminals comprising an electric heating element, a liquid heat storage medium in which said heating element is immersed, a container for said liquid and means governed by variations in the heat in said liquid storage medium for automatically and gradually effecting compensating variations in the current flow through said heating element.

3. In apparatus of the class described, circuit terminals, metallic conductors connecting said terminals comprising an electric heating element, a fluid heat carrier and storage medium in which said heating element is immersed, a container for said fluid, means for directing water over the walls of said container to effect the heating of the water, and means governed by variations in the heat in said fluid storage medium for automatically effecting a compensating variation in the current flow through said heating element.

4. In apparatus of the class described, the combination with a chamber through which water to be heated may be circulated and a conduit through which a liquid heat-carrier and storage medium may be circulated to transfer its heat to the water in said chamber, of circuit terminals and metallic conductors connecting said terminals comprising an electric heating element immersed in said liquid heat-carrier, resistance in circuit with said heating element, and means governed by the expansion and contraction of said liquid heat-carrier for effecting gradually a compensating variation in the amount of said resistance in circuit.

5. In apparatus of the class described, the combination with an electric resistance element for converting electric current into heat, a liquid heat storage medium in which said resistance element is immersed, and a closed container for said liquid, of means arranged to be operated by the increased pressure in said container due to the expansion of the heated contents thereof for reducing the amount of electric current flowing through said heating means.

6. In apparatus of the class described, the combination with circuit terminals, a metallic circuit connecting said terminals comprising an electric resistance element for converting electric current into heat, a liquid heat storage medium in which said resistance element is immersed, and a closed container for said liquid, of means responsive to variations of pressure in said container due to variations in the temperature of the contents thereof for varying the amount of current flowing through said resistance element in such manner as to maintain the temperature of said liquid substantially uniform.

7. An electric water heater comprising in combination, an electric resistance element operating to convert electric current into heat, a liquid heat storage medium in which said electric resistance element is immersed, a container for said liquid constructed to expose a relatively large surface of said liquid to the conducting action of the container wall, a water conduit arranged to conduct water over the heat conducting wall of said liquid container, and means responsive to variations in pressure in said container due to variations in the temperature of the liquid therein for varying the amount of current flowing through said resistance element.

8. In apparatus of the class described, the combination with an electric resistance element for converting electric current into heat, a liquid heat storage medium in which said resistance element is immersed, a second resistance element in series with said first mentioned element, a liquid conductor in which said second resistance element is normally immersed and by which it is normally short circuited, and a container in which said liquids are confined in such manner that increased pressure on the first mentioned liquid due to expansion by heat moves said last mentioned liquid out of short-circuiting relation to said last mentioned resistance.

9. In apparatus of the class described, a series of chambers, an electric heating element and a liquid heat storage medium in one of said chambers, an electric resistance element in circuit with said heating element and a liquid conductor in another of said chambers, and a third chamber communicating with said last mentioned chamber and in which said liquid conductor is normally maintained at such a level that the resistance is immersed in and short-circuited by the liquid conductor in its chamber, and connections between said chambers whereby the expansion of the liquid heat storage medium in the first mentioned chamber effects the movement of the liquid conductor in the resistance chamber out of short-circuiting relation to a part or all of said resistance, thereby reducing the current flow through said electric heating element.

10. Apparatus of the class described having, in combination, a chamber through which water to be heated may be circulated, means for heating said water comprising an electric heating element, a liquid heat storage medium in which said element is immersed and a conduit for circulating said medium in heat exchanging relation to the water in said chamber, a water inlet and a water outlet, said water outlet comprising a conduit for conducting the heated outgoing water through the incoming water to effect a partial preheating of the incoming water.

11. A water heater comprising a chamber in which the water to be heated may be circulated, heat transferring means in said chamber, a water inlet and a water outlet and means in the water outlet for varying the rate of flow of the outgoing water without varying the apparent size of the stream.

12. In a water heater, a plurality of concentric chambers, including an outer chamber for the incoming water having therein a heat exchange pipe for conducting a heat carrying fluid through the water in said chamber, another chamber having therein an electric heating element and a heat carrying and storage fluid, said heat exchange pipe communicating with said last mentioned chamber, an intermediate chamber surrounding said last mentioned chamber and through which the water must pass to the outlet from said heater, an outlet communicating with said intermediate chamber and an inlet communicating with said first mentioned chamber.

13. In apparatus of the class described, an electric heating element, a fluid heat storage medium in which said heating element is immersed, a container for said fluid, a mercury container comprising two compartments communicating at their lower ends, resistance in circuit with said heating element and arranged to be immersed in the mercury in one of said compartments when said mercury is at the same level in both compartments, and connections between said fluid container and the mercury compartment containing said resistance whereby expansion and contraction of said fluid due to variation of the heat content thereof varies the relative levels of the mercury in said compartments.

14. An electric water heater comprising, in combination, concentric chambers including a chamber for a heat carrying and heat storage fluid having therein an electric heating element for heating said fluid, a water chamber surrounding said heating chamber and shaped to direct the water in a comparatively thin layer over the wall of said heating chamber, an outer chamber for the incoming water, a pipe communicating with said heating chamber and arranged to conduct the heating fluid through the water in said outer chamber, resistance in circuit with said electric heating element, a chamber containing mercury in which said resistance is normally immersed to short-circuit it out of said circuit and communication between said mercury chamber and said heating chamber whereby the expansion of the heating fluid moves said mercury out of short circuiting relation to said resistance, said device comprising still another chamber in which said mercury may rise when its level in the resistance chamber is lowered.

15. In apparatus of the class described, an electric heating circuit having resistance therein, a liquid conductor in which said resistance is normally immersed and by which it is normally short-circuited, and thermostatic means whereby said liquor conductor may be automatically moved out of short-circuiting relation to a part or all of said resistance to maintain the heating action of said circuit substantially constant.

16. In apparatus of the class described, an electric circuit including resistance, a liquid conductor in which more or less of said resistance is adapted to be immersed for short-circuiting and varying the amount of resistance in circuit, and means governed by the work performed by the current flowing through said circuit for moving said liquid conductor to vary the amount of resistance immersed therein.

17. Apparatus for automatically controlling an electric current comprising a resistance element, a liquid conductor movable over said element and arranged to short-circuit said resistance when said element is immersed in said conductor and a container for said liquid conductor arranged to cause said conductor to progressively uncover said resistance when pressure is exerted upon the surface of said liquid.

18. In apparatus of the class described, an electric resistance element, a liquid conductor in which said resistance element is normally immersed and through which the current of a circuit including said resistance element flows, a container for said liquid having two chambers in one of which said resistance element is located and between which said liquid conductor is free to flow, and means for varying the pressure upon the liquid in one of said chambers whereby the relative heights of the liquids in the two chambers may be varied thereby varying the amount of resistance in the circuit including said liquid.

Signed at New York city this 30th day of December, 1921.

JOHN H. DERBY.